United States Patent [19]
Takebayashi et al.

[11] Patent Number: 5,446,708
[45] Date of Patent: Aug. 29, 1995

[54] PICKUP DRIVING SYSTEM FOR OPTICAL DISK APPARATUS

[76] Inventors: Mamoru Takebayashi, 64, Kokufuhongo, Oiso-machi, Naka-gun, Kanagawa-Ken; Takashi Tateshima, 1817-2, Okada, Atsugi-shi, Kanagawa-Ken; Tomonori Mitsui, Anekkusuohtake, 483, Tatsunodai, Zama-shi, Kanagawa-Ken; Makoto Ogawa, 396, Nagae, Hayama-machi, Miura-gun, Kanagawa-Ken; Hidehiro Takahashi, 2-6-27, Mizuhiki, Atsugi-shi, Kanagawa-Ken; Takehiro Kataoka, 2-11-4, Mizuhiki, Atsugi-shi, Kanagawa-Ken, all of Japan

[21] Appl. No.: 98,955

[22] Filed: Jul. 28, 1993

[30] Foreign Application Priority Data

Jul. 29, 1992 [JP] Japan .................................. 4-222085

[51] Int. Cl.⁶ .................... G11B 17/22; G11B 7/095
[52] U.S. Cl. .................... 369/32; 369/44.29; 369/44.35; 369/44.28
[58] Field of Search ...................... 369/32, 44.28, 44.29, 369/44.27, 44.26, 44.35, 44.36; 360/77.01, 77.02, 77.04, 77.06

[56] References Cited

U.S. PATENT DOCUMENTS

| | | | |
|---|---|---|---|
| 4,494,154 | 1/1985 | Akiyama | 369/44.29 |
| 4,697,256 | 9/1987 | Shinkai | 369/32 |
| 4,817,069 | 3/1989 | Shigemori | 369/44.28 |
| 4,817,073 | 3/1989 | Suzuki | 369/30 |
| 4,858,214 | 8/1989 | Baba | 369/32 |
| 5,050,149 | 9/1991 | Ishii et al. | 369/44.29 |
| 5,054,013 | 10/1991 | Kawamura | 369/44.25 |
| 5,056,074 | 10/1991 | Tateishi et al. | 369/44.28 |
| 5,101,391 | 3/1992 | Ishii et al. | 369/44.29 |
| 5,103,440 | 4/1992 | Yamamuro | 369/44.28 |
| 5,142,518 | 8/1992 | Hangai et al. | 369/44.35 |
| 5,150,344 | 9/1992 | Iwase et al. | 369/44.29 |

*Primary Examiner*—Georgia Y. Epps
*Assistant Examiner*—Tan Dinh

[57] ABSTRACT

A pickup driving system for an optical disk apparatus is disclosed for moving a pickup unit across tracks of a rotating optical disk to read data at a target track position on the optical disk while avoiding drive motor instability, and errors caused by position overruns and underruns. A pulse voltage is superposed on the driving voltage of the drive motor for driving the pickup unit at predetermined intervals (defined by the pulse train) toward the target track position.

4 Claims, 1 Drawing Sheet

PICKUP DRIVING SYSTEM FOR OPTICAL DISK APPARATUS

BACKGROUND OF THE INVENTION

This invention relates to a pickup driving system for an optical disk apparatus and, more particularly, to a pickup driving system for an optical disk apparatus in which a pickup unit is so moved as to cross tracks of a rotating optical disk to read data.

Description of the Prior Art

In a conventional optical disk apparatus, a pickup unit is driven, for example, in a radial direction of the optical disk by a driving motor so as to move a pickup to a designated track of the optical disk. Thus, as a mechanism for radially moving the optical disk, there are various types, and a representative one is a rack-pinion type. This type is provided to move the entire pickup by a rack and a pinion, to detect a deviation of a tracking by two spot beams for detecting a tracking and to always so control to follow up that a signal reading spot beam is always disposed at a center of a data pit of the optical disk.

However, although the rack-pinion type has a merit of a low cost, the type has a demerit that its accessing speed is slower than that of an ordinary hard disk due to a problem in its structure and, in order to accelerate its operating speed in a system using an optical disk, it is a most important subject to accelerate the operating speed of the optical disk. However, even if a reduction gear ratio of the rack and the pinion from a driving motor of a pickup unit to the pickup unit is raised so as to accelerate the operating speed of the pickup unit, the following problems still arise.

When a reduction gear ratio of the rack and the pinion from the driving motor of the pickup unit to the pickup unit is lowered, an operation of the pickup unit per unit revolution of the motor between the driving motor and the pickup unit is increased. As a result, the moving speed of the pickup unit with respect to the same driving power is increased, and a moving error is hence increased. Thus, at the time of reproducing the optical disk, an overstroke of a head mounted at the pickup unit occurs. When the reduction gear ratio of the rack and the pinion is decreased, a resistance of the driving motor to be started from a stopped state to a rotating state is increased, the operating state of the driving motor becomes unstable, and hence the operation of the pickup unit becomes unstable.

SUMMARY OF THE INVENTION

Accordingly, it is an object of this invention to provide a pickup driving system for an optical disk apparatus in which a pulse voltage is superposed on a driving voltage of a driving motor for driving a pickup unit at a predetermined interval.

Another object of this invention is to provide a pickup driving system for an optical disk apparatus in which a driving voltage of a driving motor for moving the pickup unit is generated only when the pulse voltage is on.

In order to achieve the above-described objects, the pickup driving system for the optical disk apparatus is constructed as will be described in detail later. With the arrangement, in the driving motor of the pickup unit, the pulse voltage is operated as an auxiliary energy of a starting energy (a feeding error signal) to lower an apparent starting voltage. Thus, the driving motor is always set to a state near a dynamic frictional state, thereby obtaining a stable follow-up performance of the driving motor. Hence, even if a reduction gear ratio of the driving motor to the pickup unit is decreased and its accessing speed is accelerated, the overstroke of the head of the conventional optical disk apparatus described above and the unstable state of the operation of the driving motor can be eliminated.

DETAILED DESCRIPTION OF PREFERRED EMBODIMENTS

Figure 1:
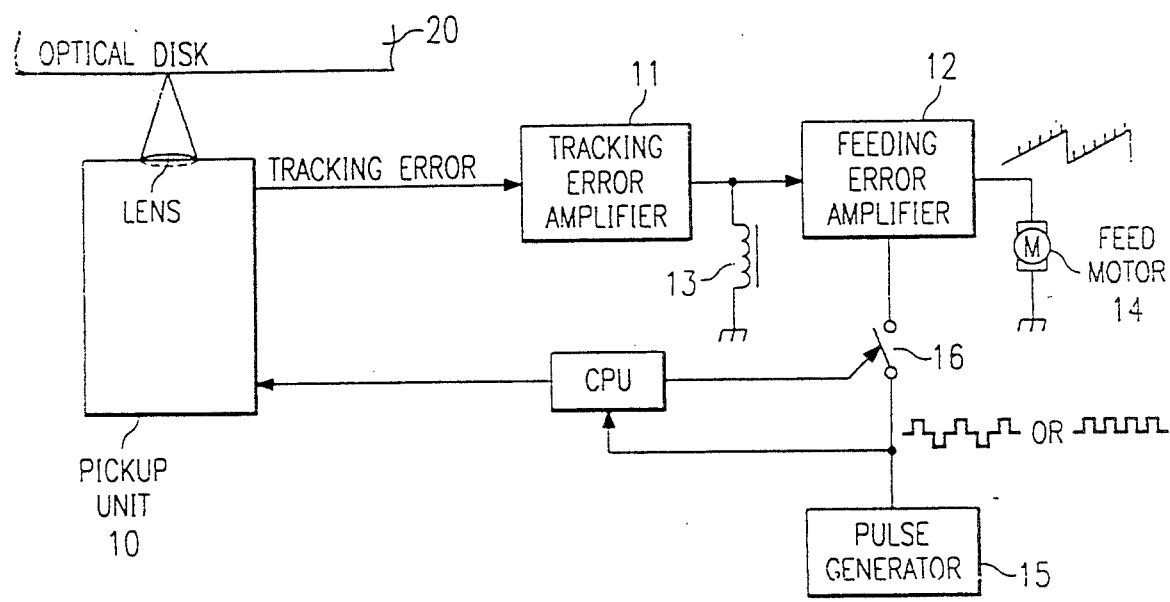
FIG. 1 is a view of an arrangement showing an embodiment of a pickup driving system for an optical disk apparatus according to this invention.
Figure 2:
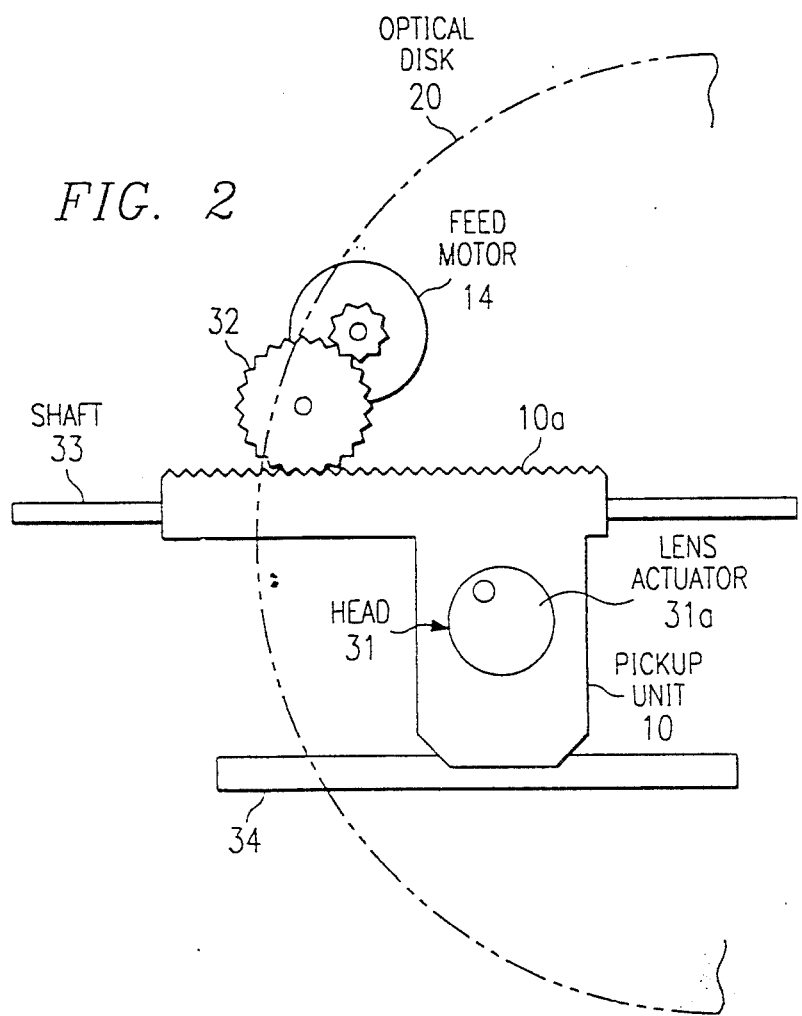
FIG. 2 is a plan view showing an example of a sliding mechanism of a pickup unit of the pickup driving system shown in FIG. 1.

An embodiment of the present invention will be described with reference to FIGS. 1 and 2. FIG. 1 is a view of a basic arrangement of an embodiment of a pickup driving system for an optical disk apparatus according to this invention, and FIG. 2 is a view showing an example of a pickup feeding mechanism of the pickup driving system shown in FIG. 1. In the drawings, reference numeral 10 designates a pickup unit for detecting a tracking error. The pickup unit 10 is assembled in a sliding mechanism of a rack-pinion type shown, for example, in FIG. 1 and so operated as to move to a necessary track of an optical disk 20. Reference numeral 11 denotes a tracking amplifier for amplifying an output of the pickup unit 10; 12, a feeding error amplifier for amplifying an output of the tracking error amplifier 11; 13, a tracking coil connected to an output side of the tracking error amplifier 11 for correcting a tracking error; 14, a feed motor or a driving motor connected to an output side of the feeding error amplifier 12; 15, a pulse generator for generating a periodic pulse having positive and negative polarities or a unipolar periodic pulse; and 16 a switch for selecting whether the output of the pulse generator 15 is supplied to the feeding error amplifier 12 or not by a CPU.

In FIG. 2, reference numeral 31 indicates a head which includes a laser diode, a prism, a photodiode, a collimator lens, an objective lens, a lens actuator 31a, etc. The elements for constituting the head are known, and hence the description thereof will be omitted. The lens actuator 31a contains the tracking coil 13. In FIG. 2, reference numeral 32 illustrates a pinion to be engaged with a rack 10a of the pickup unit 10; and 33, 34 are shafts for moving the pickup unit 10.

When a pulse output of the pulse generator 15 is supplied to the feeding error amplifier 12 by way of CPU controlled switch 16, periodic pulses from the pulse generator 15 are superposed on a sawtooth driving voltage of the feeding error amplifier 12, and the resultant driving voltage from the feed error amplifier 12 is supplied to the feed motor 14. Thus, the feed motor 14 is always set to the state near a dynamic frictional state. Then, a shifting distance of the pickup at the time of moving the pickup can be decreased as compared with that in the conventional pickup driving system. Accordingly, a problem of the conventional pickup driving system such as an overstroke of a head at the time of reproducing the optical disk apparatus does not occur. In addition to such advantageous effect of this invention, the accessing speed of the pickup driving system can be accelerated faster than that of the conventional pickup driving system by decreasing the reduction gear ratio of the rack and the pinion. Further, the operation of the pickup driving system against damage of the optical disk, the malfunction of the operation of the optical disk apparatus due to an external vibration can be reliably performed by always decreasing a load to a lens returning spring. In the conventional pickup driving systems, loads of the feed motors 14 are different according to different types and hence the loads are accommodated by varying the driving voltage or by using other regulating method. However, according to this invention, the loads of the feed motors 14 can be simply accommodated by altering the amplitude of the pulse voltage to be superposed on the driving voltage of the feed motor 14. In accordance with the way of the above-described thought, playability of a mechanism having a number of fluctuations can be improved. For example, pulses of a minimum amplitude capable of starting a feed motor are superposed on a driving voltage of the feed motor to start the feed motor, thereby controlling a delicate operation of the feed motor at the time of starting.

In operation, the pickup unit 10 detects any tracking error which occurs in positioning the pickup unit to a target track of the optical disk 20 in response to a CPU command, and issues a tracking error signal to the tracking error amplifier 11. The amplifier 11 in turn amplifies the error signal, which is output to energize tracking coil 13 of the lens actuator 31a of head 31 to generate a spot beam to read track position information on optical disk 20. In addition, the output of amplifier 11 is supplied to the feed error amplifier 12, which generates a sawtooth driving voltage. A pulse signal having positive pulse amplitudes of a magnitude (when combined with the sawtooth driving voltage) to start the feed motor is produced by the pulse generator 15 and sensed by the CPU, which in turn controls the operation of switch 16 to supply positive amplitude pulses of the generator 15 to the amplifier 12. As a result, positive pulses are superimposed on the sawtooth output of amplifier 12, and the resulting driving voltage is supplied to the feed motor 14 to set the feed motor in a periodic dynamic state. The feed motor 14 thereupon engages the pinion 32 of FIG. 2 to position the pickup unit 10 to place the spot beam of head 31 at the appropriate track position.

The same operation and effect as those described above can be expected by generating a driving voltage of the driving motor for driving the pickup unit only when the pulse voltage is on instead of superposition of the pulse voltages on the driving voltage of the driving motor at a predetermined interval.

According to the pickup driving system for the optical disk apparatus in accordance with this invention as described in detail above with respect to the embodiment thereof, the pulse voltage is superposed on the driving voltage of the driving motor for driving the pickup unit at a predetermined interval, or the driving voltage of the driving motor for moving the pickup unit is generated only when the pulse voltage is on. Accordingly, the driving motor of the pickup is always set to the state near a dynamic frictional state (a frictional state during an operation to be used with respect to a static frictional state (a frictional state during a stoppage)). Thus, even if the rotating speed of the driving motor is raised to increase the accessing speed of the pickup unit to the optical disk, an overstroke of the conventional head, an unstable operation of the conventional driving motor can be eliminated.

The present invention may be variously modified within the scope of the spirit of the present invention, and the modifications thereof will be naturally included in the scope of the present invention.

What is claimed is:

1. A system including a central processing unit for correcting errors in position of an optical pickup unit having an optical read head for reading information stored on an optical disk, which comprises:
   (a) tracking error generation means for measuring a difference between a target track position commanded by said central processing unit and an actual track position of said optical pickup unit, and issuing an error signal based upon said difference;
   (b) first amplifier means in electrical communication with said tracking error generation means for amplifying said error signal;
   (c) an actuator coil in said optical read head in electrical communication with said first amplifier means for actuating said optical read head to read track information stored on said optical disk;
   (d) second amplifier means in electrical communication with said actuator coil and said first amplifier means for supplying a drive voltage having superimposed thereon a pulse train;
   (e) pulse generator means in electrical communication with said central processing unit for generating a pulse signal which is sensed by said central processing unit;
   (f) switch means in electrical communication with said central processing unit and said pulse generator, and receiving said pulse signal and commands from said central processing unit, and supplying said pulse train to said second amplifier means; and
   (g) feed motor means electrically connected to an output of said second amplifier means and responsive to said drive voltage for moving said read head during intervals determined by said pulse train to said target track position.

2. The system set forth in claim 1 above, wherein said second amplifier means supplies a drive voltage having a sawtoothed waveform, and is turned on and off in response to said pulse train.

3. A method for correcting errors of position of an optical pickup unit having an optical read head for reading information stored on an optical disk, which comprises the steps of:
   (a) generating an error signal indicative of the difference between a target track position on said optical disk and an actual position of said optical pickup unit;
   (b) generating a pulse train having pulse amplitudes of a first maximum amplitude;
   (c) in response to said error signal, activating said optical pickup unit to read track information from said optical disk, and generating a sawtoothed drive voltage having a second maximum amplitude;
   (d) superimposing said pulse train on said sawtoothed drive voltage to generate a composite drive voltage; and
   (e) in response to said composite drive voltage, moving said pickup unit in intervals determined by said pulse train toward said target track position.

4. A method for correcting errors of position of an optical pickup unit having an optical read head for reading information stored on an optical disk, which comprises the steps of:

(a) generating an error signal indicative of the difference between a target track position on said optical disk and an actual position of said optical pickup unit;

(b) generating a pulse train;

(c) in response to said error signal, activating said optical pickup unit to read track information from said optical disk, and generating a sawtoothed drive voltage during intervals determined by said pulse train; and (d) in response to said sawtoothed drive voltage, moving said pickup unit toward said target track position.

* * * * *